United States Patent
Hayes et al.

(10) Patent No.: US 8,485,175 B1
(45) Date of Patent: Jul. 16, 2013

(54) HEATER WITH CATALYST AND COMBUSTION ZONE

(75) Inventors: Claude Hayes, Brentwood, TN (US); Samir Barudi, Huntington Beach, CA (US); Joseph B. Lee, Jr., Bowling Green, KY (US); Eric Pitchford, Bowling Green, KY (US)

(73) Assignee: Procom Heating, Inc., Brea, CA (US)

( * ) Notice: Subject to any disclaimer, the term of this patent is extended or adjusted under 35 U.S.C. 154(b) by 968 days.

(21) Appl. No.: 12/564,020

(22) Filed: Sep. 21, 2009
(Under 37 CFR 1.47)

Related U.S. Application Data

(60) Provisional application No. 61/098,401, filed on Sep. 19, 2008.

(51) Int. Cl.
*F24H 3/02* (2006.01)

(52) U.S. Cl.
USPC .............. 126/110 B; 126/110 C; 126/110 A; 126/110 E; 126/110 R

(58) Field of Classification Search
USPC ............... 126/110 B, 110 C, 110 A, 110 E, 126/110 R; 431/353, 8; 432/222
See application file for complete search history.

(56) References Cited

U.S. PATENT DOCUMENTS

| | | | |
|---|---|---|---|
| 2,107,365 A | 2/1938 | Bray | |
| 4,047,877 A | 9/1977 | Flanagan | |
| 4,081,238 A * | 3/1978 | Briggs et al. | 432/222 |
| 4,340,362 A | 7/1982 | Chalupsky et al. | |
| 4,383,824 A | 5/1983 | Findlay et al. | |
| 4,555,232 A | 11/1985 | Raccah et al. | |
| 4,726,767 A | 2/1988 | Nakajima | |
| 4,828,170 A | 5/1989 | Takman | |
| 4,848,315 A | 7/1989 | Adler | |
| 5,678,534 A | 10/1997 | Fleming | |
| 5,816,237 A | 10/1998 | Fleming | |
| 5,839,428 A | 11/1998 | Schroeter et al. | |
| 5,848,887 A | 12/1998 | Zabielski et al. | |
| 5,906,197 A | 5/1999 | French et al. | |
| 5,934,268 A | 8/1999 | Onocki | |
| 5,938,427 A | 8/1999 | Suzuki et al. | |
| 6,142,141 A | 11/2000 | Long | |
| 6,470,876 B1 | 10/2002 | Schmidt et al. | |
| 6,648,635 B2 | 11/2003 | Vandrak et al. | |
| 6,971,380 B2 | 12/2005 | Mills et al. | |
| 6,983,550 B1 | 1/2006 | Lin | |
| 7,273,366 B1 | 9/2007 | Sujata | |

* cited by examiner

*Primary Examiner* — Alfred Basichas
(74) *Attorney, Agent, or Firm* — Middleton Reutlinger; Chad D. Bruggeman; John F. Salazar

(57) ABSTRACT

A forced air heater is described having a plurality of combustion zones and an interceding cooling zone with active cooling devices. Catalytic oxidation may be implemented in the combustion zone whereby efficiency is increased by cooling the combustion products and outflow to more efficient temperatures. The catalytic bed of the combustion zone may be placed downstream of the cooling and primary combustion zone to remove noxious combustion by-products and an afterburner may also be included.

20 Claims, 7 Drawing Sheets

HEATER WITH CATALYST AND COMBUSTION ZONE

CROSS-REFERENCE TO RELATED APPLICATION

This application under 35 USC §119(e) claims priority to, and benefit from, U.S. Provisional Application Ser. No. 61/098,401, filed on Sep. 19, 2008, entitled "Heater with Catalyst and Combustion Zone," which is currently naming the above-listed individuals as co-inventors.

BACKGROUND OF THE INVENTION

The present invention relates generally to fuel burning portable forced air heaters and particularly towards portable forced air heaters which have a first and second combustion chambers in combination with a passive cooling device, a cooling zone and a catalyst.

DETAILED DESCRIPTION OF THE PREFERRED EMBODIMENTS

Figure 1:
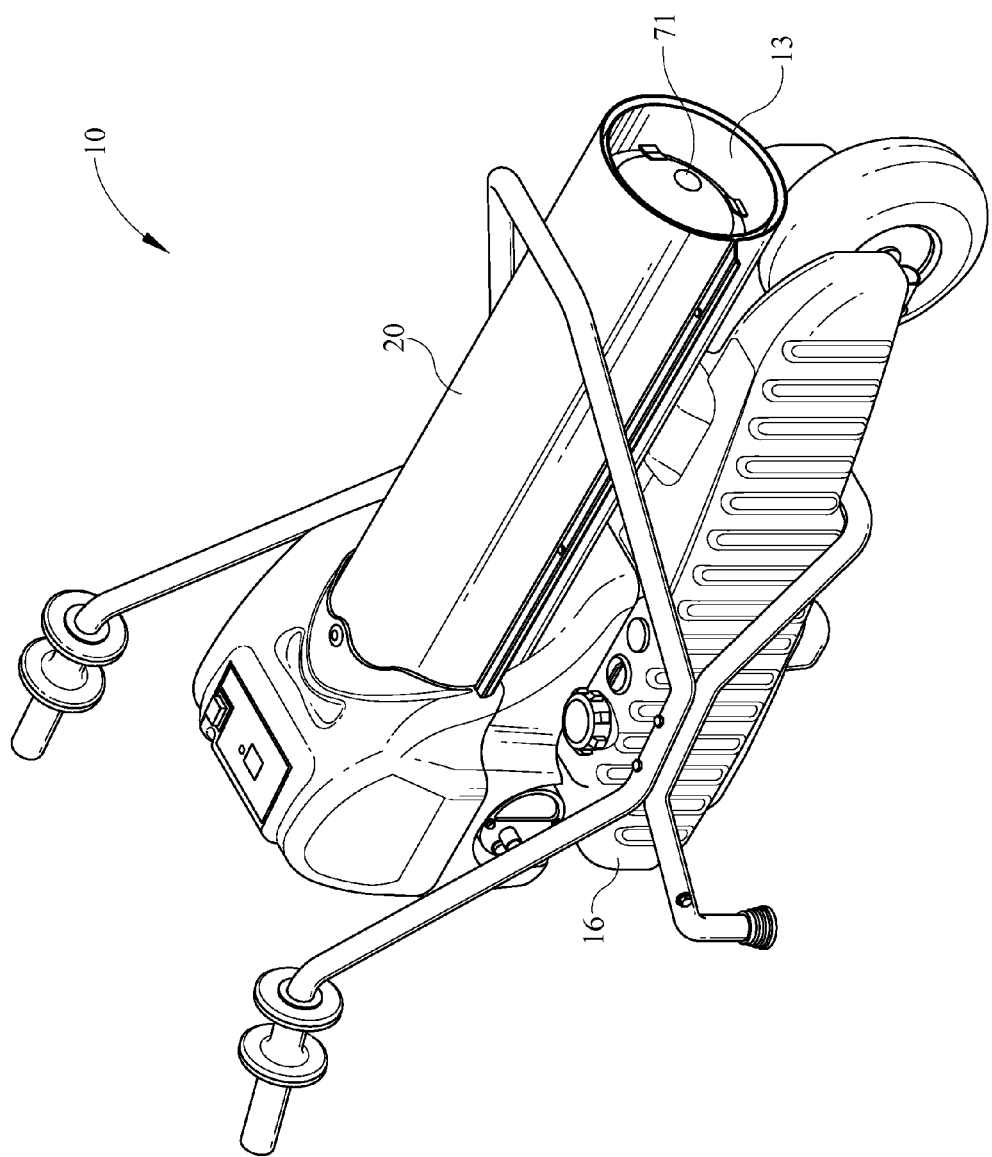
FIG. 1 is a top perspective view of the heater of the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Portable forced air heaters, namely those types of heaters which are readily portable by a user for positioning to an area needing heat, typically utilize varying types of fuel including both liquid and gas fuel elements. Preferably in any portable forced air type heater, constituent elements of incomplete combustion are preferably kept to a minimum. One manner of keeping such elements to a minimum and preventing noxious output of the portable forced air heater of the present invention is by implementing the use of a catalyst in a secondary combustion or oxidation zone at the heat outlet end of the portable forced air heater. Further, desirable combustion characteristics may be exhibited through the utilization of a first combustion zone separated from a second combustion zone through the use of a cooling zone and active cooling devices. Subsequent to a cooling zone, a second combustion zone may utilize a catalyst to interact with the combustion output elements of the forced air heater of the present invention. Typically, in one embodiment, the first combustion zone may be a fuel oxidation area or flame zone wherein the fuel exiting the nozzle may be ignited. Alternative embodiments may implement utilization of additional or secondary combustion zones wherein flameless or catalytic combustion occurs where the fuel and/or products of incomplete combustion are oxidized to complete the combustion process. Interposed between a first and a second combustion zones may be implemented a cooling zone with active cooling devices designed to quench or reduce the flame from the primary combustion zone and provide a reduction in average temperature as well as a reduction in oxidation, with the reduction in average temperature in a further embodiment sufficient to enable oxidation in the secondary combustion zone through the use of a catalyst element. Active cooling elements may include but not be limited to air disruption devices designed to disrupt air flow in the cooling zone and enhance cooling efficiency.

The portable forced air unit 10 of the present invention is depicted in the figures and in reference to FIGS. 1, 2, 3 and 4 incorporate the structure of a plurality of embodiments wherein a plurality of combustion zones, a fuel inlet, multiple positions of a catalyst or catalytic element and varying air inlets may be utilized. In the embodiment depicted in FIG. 1 and FIG. 3, it is apparent that a primary or first combustion zone 38 is positioned internally within a combustion chamber comprising the heat shield 33, combustion chamber sleeve or wall 31, and other internal elements of the heater being surrounded by the outer housing 20. Multiple air flow channels or singular air flow channels may be provided between the combustion chamber and the heat shield wall depending on desired flow and air mixing characteristics. Such singular or multiple ambient air flow channels may be implemented as is known in the art.

Figure 5A:
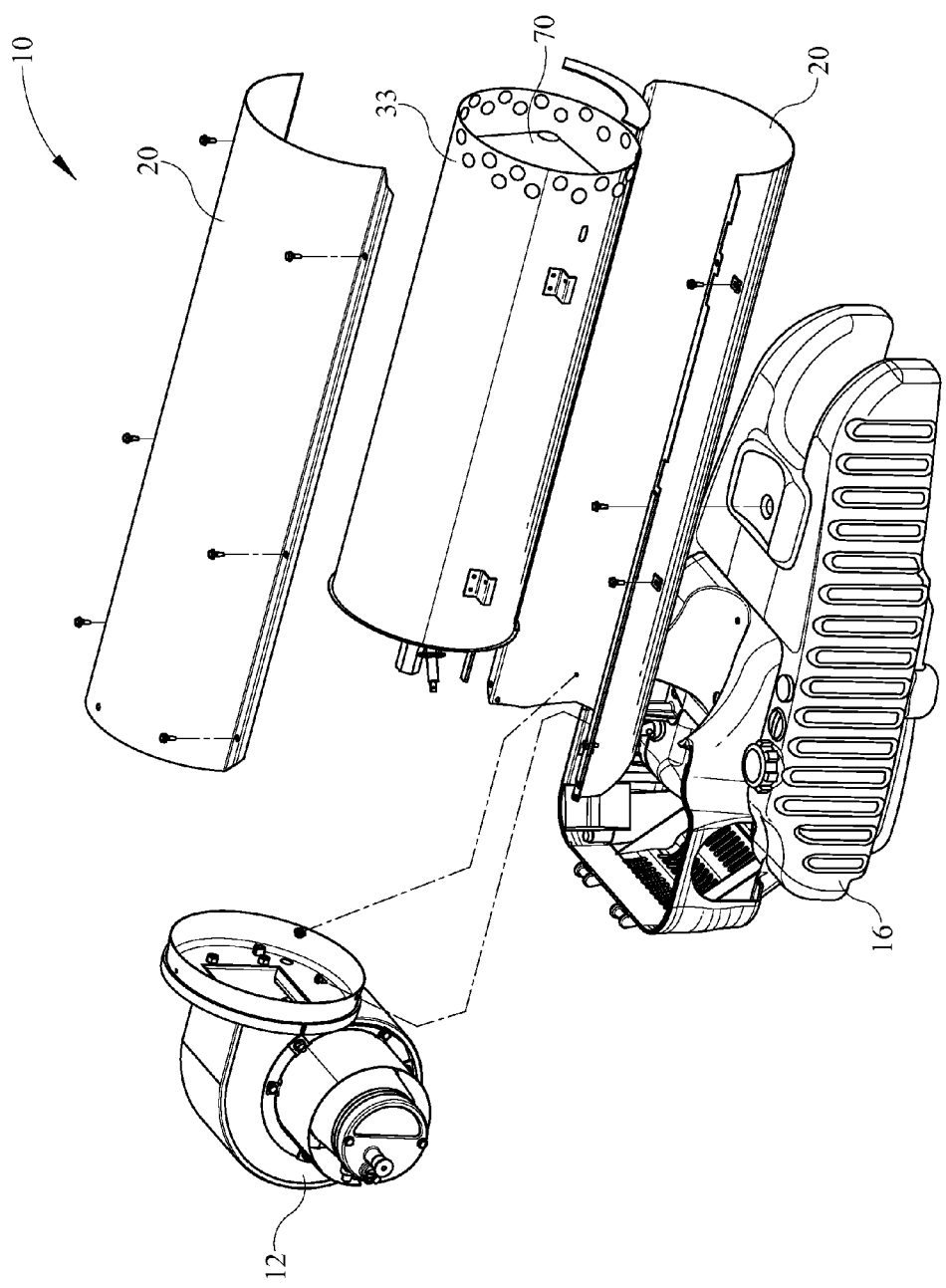
FIGS. 5a-5b are an exploded view of the assembly of the present invention.
Figure 5B:
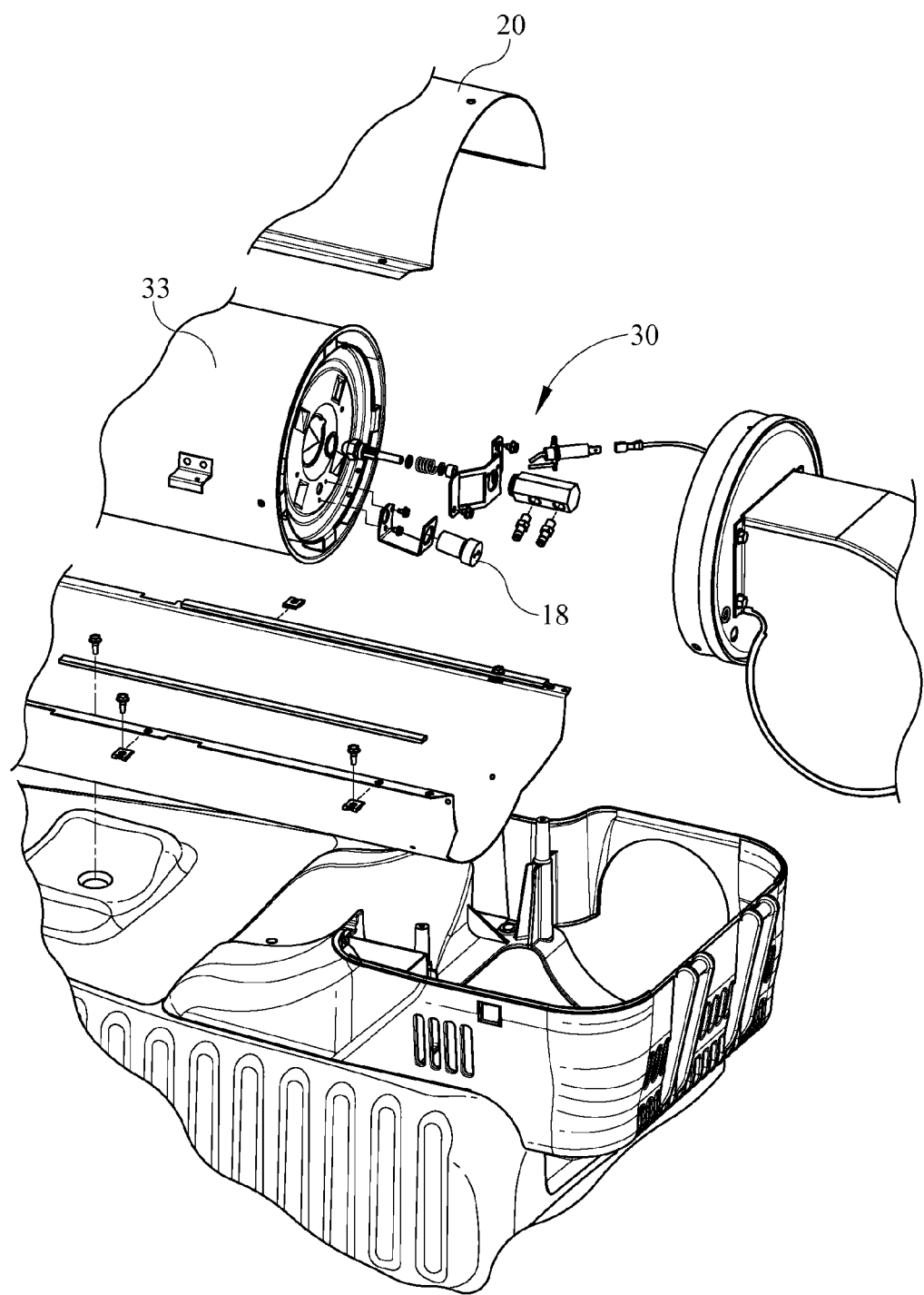
Figure 6:
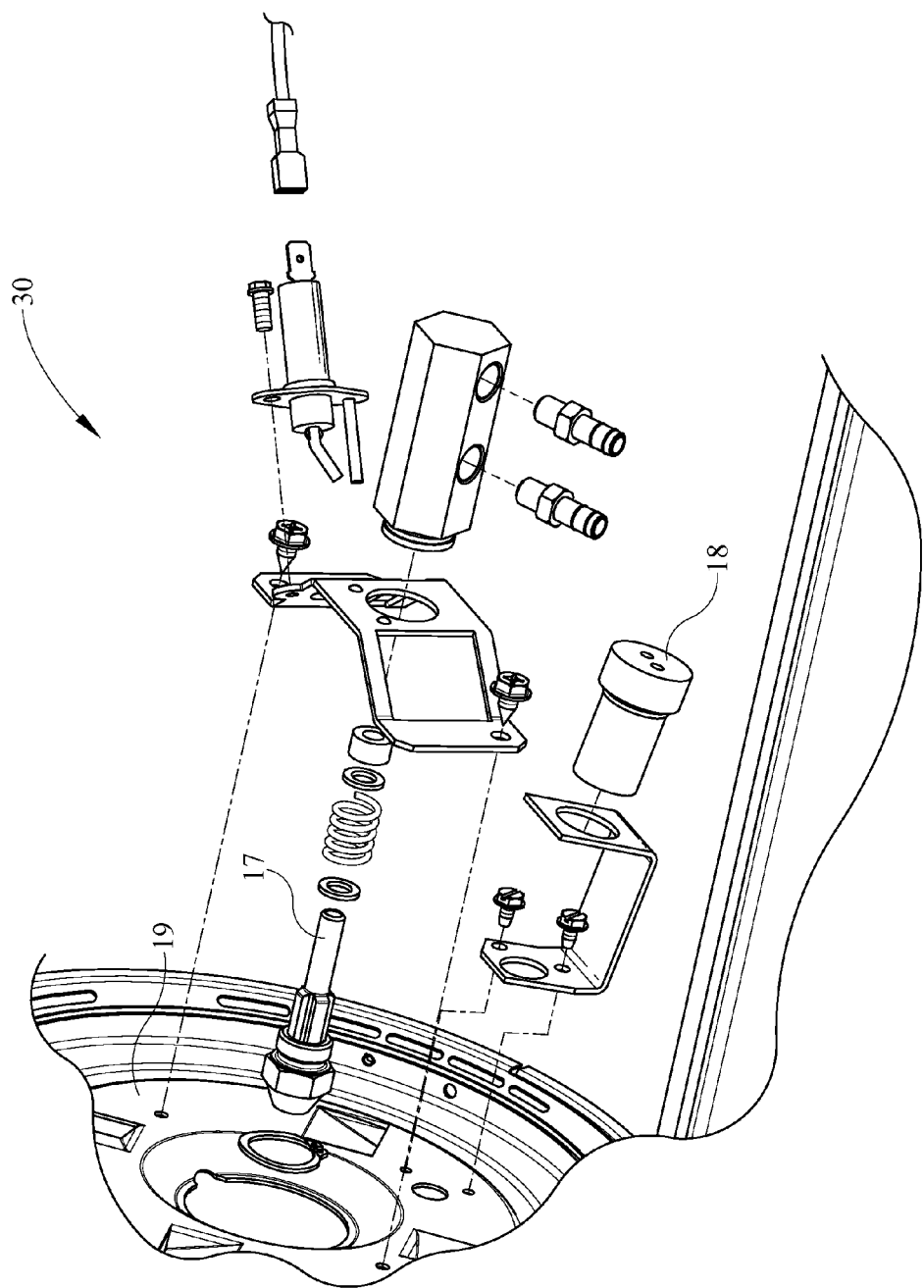
FIG. 6 is a detailed view of one of the fuel injection systems for use with the heater of the present invention.

The portable forced air heater 10 of the present invention implements the utilization of a fan assembly 12 which provides air at constant or varying speed into the interior of the outer housing 20 directed towards the enclosed combustion chamber. There is positioned downstream of the fan assembly 12 a combustion chamber header or air inlet 19 which has, in the present embodiment depicted, essentially aligned therein a fuel line 17 and fuel nozzle assembly 30 shown in FIGS. 5b and 6 for provision of a combustible fuel into the interior of the combustion chamber with metered air through header 19. An igniter may be also supplied and provided along a structural subassembly as shown in FIG. 6 as is known, positioned within the outer housing 20 or affixed thereto for igniting the atomized or vaporized fuel as appropriate and as known in the art. Thermocouple, optical sensor or other measuring or sensing device 18 may be provided to enable various sensor characteristics necessary for proper control and combustion of the fuel and supplying such characteristics to a control subassembly not shown. This includes internal thermostats, optical flame recognition and the like.

Fuel from fuel tank 16 may be provided to the fuel line 17 thereby feeding fuel at varying pressures to the fuel nozzle assembly 30 for combustion within the combustion chamber.

The fuel tank 16 may implement the utilization of either a liquid and a gaseous fuel such as kerosene, propane, diesel or other carbonaceous type fuel. Known tanks, supply lines and fuel atomizers may be implemented in the fuel subassembly to provide adequate burn characteristics within the combustion chamber. The portable forced air unit 10 of the present invention is sufficient in size such that there is ready mobility by a user or operator and repositioning may be implemented. Heater output may be as is necessary including, but not limited to, outputs of 100,000, 150,000 and 200,000 BTU/HR.

Returning to the primary depiction of one embodiment described herein and shown in FIGS. 3, 5a, 5b and 6, the portable forced air unit 10 of the present invention may have an exterior cylindrical housing 20 in the present embodiment which surrounds the heat shield 33. Of course, as depicted in the embodiments, housing 20 and heat shield 33 may be combined. Internal of the heat shield 33 and combustion chamber sleeve or wall 31 is a combustion zone 38 which is the primary combustion zone for flame combustion and oxidation of the fuel mixture provided by fuel nozzle subassembly 30. Air is supplied into the combustion zone 38 by the fan assembly 12 at the combustion chamber air inlet or header 19. Air provided by the fan assembly 12 may also pass around the heat shield 33 through the ambient airflow channel 23 to maintain the exterior of the PFA unit 10 at a cool temperature while also providing a source of ambient air for later mixing either in one or all combustion zones and cooling zones described herein. The ambient airflow channel 23 may be in direct flow communication with the fan assembly 12 or with external ambient air directly received from outside of the outer housing 20.

As can be seen from the embodiments depicted in the figures, the primary or first combustion zone 38 may be implemented in combination with the utilization of a cooling zone 37 downstream in conjunction with active cooling devices such as airflow inhibitors or flanges 75, 68. By flow communication it is meant that airflow may be exchanged between the areas and does not necessarily connote specific structural relationships or positioning between the recited and related structural elements. The cooling zone 37 depicted in the figures for the present embodiment is considered to be an area wherein a reduction in temperature of gases and diminishment of combustion rate occurs. As shown in the figures, the cooling zone is separately and appropriately spaced to provide correspondingly sufficient cooling of the exhaust gases from the primary combustion zone 38 after flame combustion of the fuel provided through fuel nozzle 30 in order to obtain and/or maintain temperatures within the range for proper catalytic action.

In typical combustion zones 38 of the varying embodiments depicted, depending upon the fuel source and fuel type, spot temperatures at a point within the primary combustion zone 38 may be between 1100 degrees to 3800 degrees Fahrenheit depending upon a number of variables including the amount of excess air provided by the fan assembly 20 through the combustion chamber air inlet 19. The maximum temperature typically exhibited within a primary combustion zone for a portable forced air heater unit 10 may be about 3000 degrees for liquid fuels and the typically exhibited range of peak temperature may be between 2200 and 3000 degrees for such liquid fuels. Regarding potential embodiments utilizing gaseous fuels, spot temperatures within the combustion chamber may be between 1800 degrees to 2200 degrees Fahrenheit depending upon a number of variables including the amount of excess air provided by the fan assembly 20 through the combustion chamber air inlet 19, the air mixture, the nozzle assembly 30 and other known factors. These peak oxidation temperatures located within the combustion chamber may vary significantly. However, due to the high peak oxidation temperatures exhibited within the combustion chamber, lower temperatures may be needed downstream of the primary combustion zone 38 for other oxidation and catalytic reactions.

In various embodiments, temperature reduction may be achieved through the utilization of a cooling zone in which the combustion flame is significantly reduced and a reduction in average air temperature is exhibited sufficiently to allow efficient catalytic oxidation so that when a downstream catalytic agent impinges upon the heated air and products of combustion, as well as incomplete combustion, a predefined maximum catalytic oxidation temperature would not be exceeded. Depending on the particular catalytic agent utilized and implemented within the portable forced air unit of the various embodiments, these temperatures may be between about 400 degrees and about 1700 degrees Fahrenheit, depending upon the catalytic agent utilized, how much of the combustion products are attempted to be oxidized and other known factors. An objective therefore of the cooling zone is to sufficiently slow the rate of oxidation in order to allow implementation of efficient catalytic oxidation.

Figure 2:
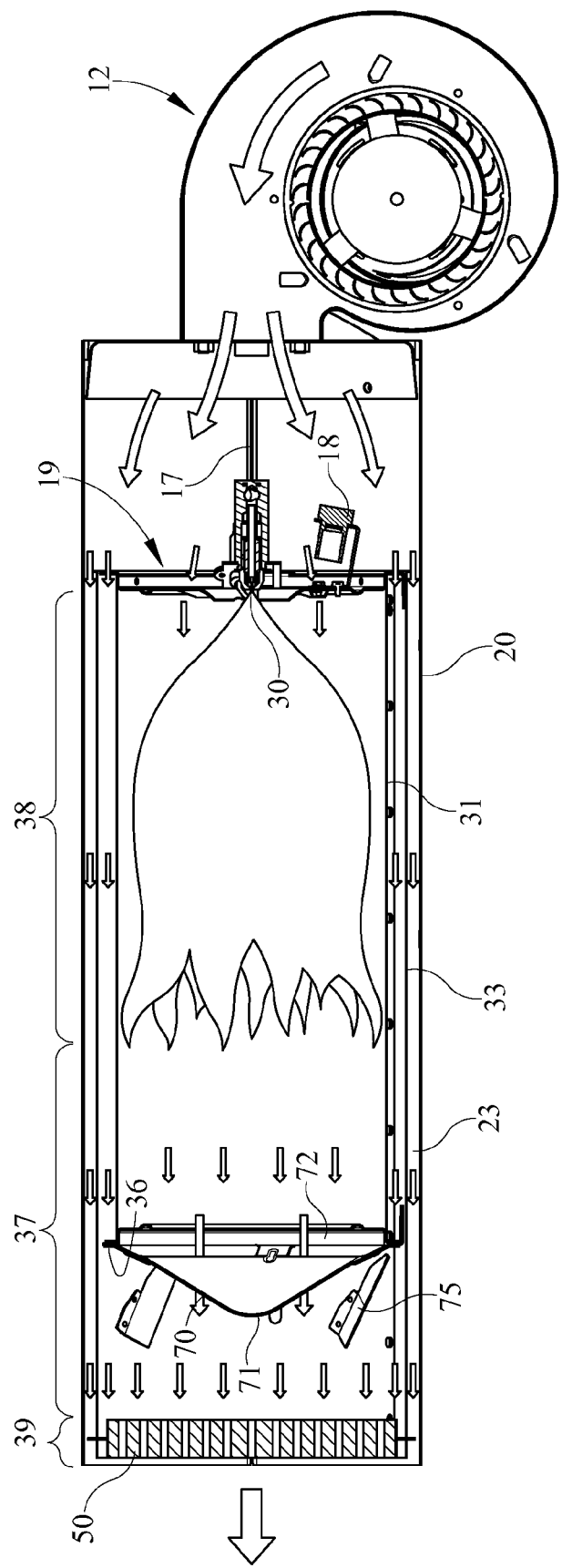
FIG. 2 is a side sectional view of the heater of the present invention.
Figure 3:
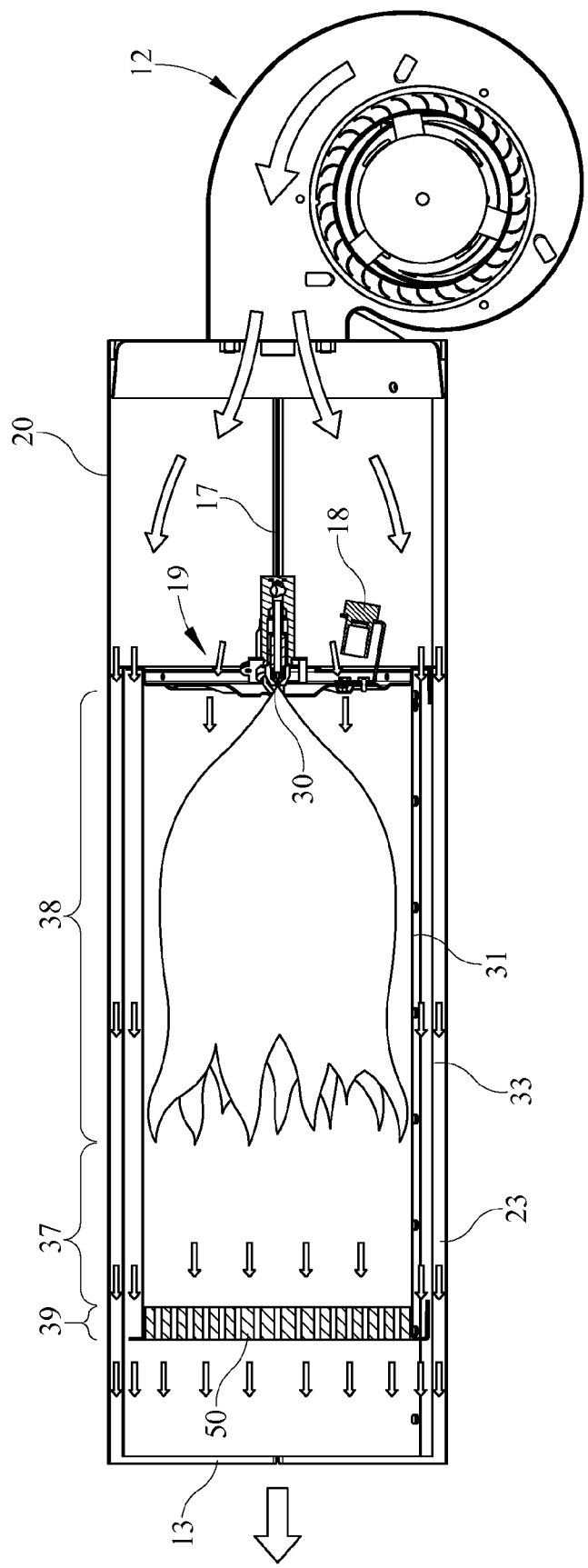
FIG. 3 is a side sectional view of an alternative embodiment of the present invention.

As depicted in the present embodiment, a cooling zone 37 is in axial alignment with the combustion zone 38. However, as is well known in the art, axial alignment of the various zones depicted herein and shown in the various embodiments is not necessarily needed or required. The cooling zone 37 in the embodiment of FIG. 2 is downstream of the primary combustion zone 38 and is maintained within the housing 20 and receives the primary products of combustion produced from the primary combustion zone 38. Additionally, as may be readily understood, the cooling zone 37 may also receive ambient air from ambient airflow channel 23 either from output of air from the fan assembly 12 or from a direct ambient airflow source exterior to the outer housing 20, both possibly providing such ambient air through the wall 31 of the combustion chamber or at a mixing area downstream of flame combustion, for example.

In conjunction with the cooling zone 37, a number of variant active cooling devices may be implemented. Such devices may include the air flow flanges 75, 68 or afterburner 70 which act to disrupt the laminar airflow through the housing 20. These air disruption zones may more efficiently reduce average temperature as compared to unimpeded air through the cylindrical housing. These devices actively interfere in the flow of combustion products through the heater, such interference causing mixing, turbulence and other air cooling actions. Thus, when heated air flows by these structures, the average temperature of the heated air may be reduced to stay within temperature limits defined by the downstream catalytic agent. These structures can include air inlet openings as well as air deflectors to aid in deflection and mixing of ambient air with heated air.

Downstream of the cool zone 37 is depicted in the present embodiment a secondary combustion zone 39. The secondary combustion zone may allow oxidation of the combustion products downstream of the primary combustion zone in varying manners. As depicted in the present embodiment, such secondary combustion zone 39 may include a catalytic bed 50 of various known structures and construction to allow oxidation of the by-products of combustion in known catalytic exchanges. The catalytic bed 50 may include palladium, platinum, zinc, titanium as well as other promotes such is vanadium, chromium, rhodium cobalt, nickel, and other known compounds, as well as other materials known to catalyze or react with complete or incomplete combustion by-products in an effort to reduce the undesirable combustion by-products from exiting the heater. This includes hydrodesulfurization or hydrodenitrogenation of the organic compounds. In some of these cases, the reactions in the secondary combustion zone may not be combustion type reactions.

The cooling zone 37 depicted herein may alternatively be placed as depicted in the multiple embodiments in nonlinear alignment with the combustion zone of the combustion chamber or with the fan assembly air conduit and air inlet 19. Multiple configurations may be implemented for utilization of a cooling zone as well as a secondary combustion zone wherein airflow may pass through multiple chambers of a cooling zone 37 and combustion zone 39, each of the chambers in nonlinear sequence or in alternative configuration. The chambers may be implemented in these alternative embodiments wherein the combustion zone 39 and the catalyst 50 may be combined in one axial flow chamber or in combination with separated flow chambers with the cooling zone or combined with the cooling zone.

Figure 4:
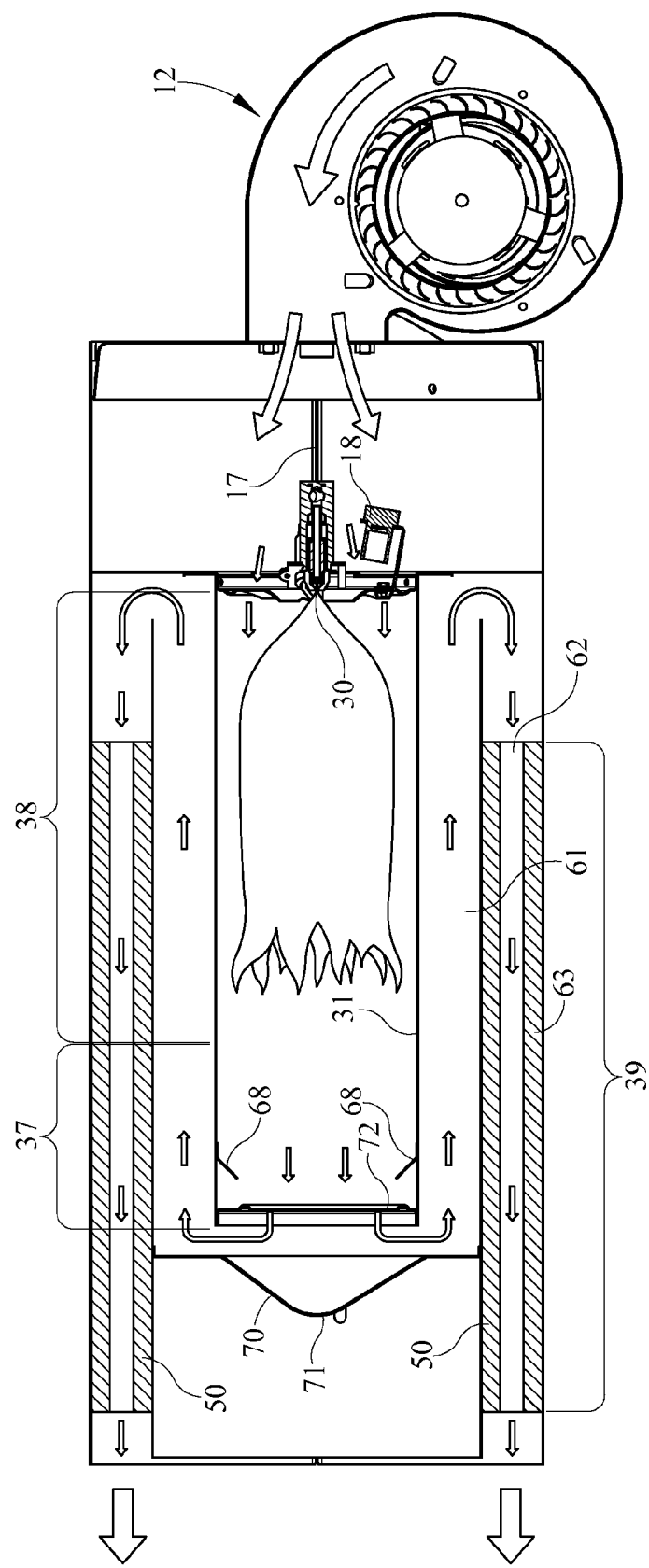
FIG. 4 is a side sectional view of an alternative embodiment of the present invention.

For example, as can be seen in FIG. 4, air disruption fingers 68 extend inwardly within the cooling zone 37 to prevent laminar airflow and thus cause increased cooling efficiency. Additional cooling flow path 61 is provided in reverse direction from chambers 38, 37 which accepts air redirected around afterburner ring 72. Cooling flow path 61 redirects heated air and products of combustion into secondary combustion chamber 62. The secondary combustion chamber 62 includes catalytic beds 63 in the flow path of the secondary combustion chamber 62. The catalytic bed 63 may be constructed in a number of various manners to increase the efficiency of the catalytic action and the material utilized may be selected from those known in the art to react with combustion by-products. In such an embodiment, all of the airflow may be redirected through the catalytic beds or in such a portion as may be variably selected. Such variance may allow portions to flow through the afterburner and portions may be redirected through the beds depending on the desired reactions and the amount of catalytic activity intended.

Alternatively, only a single co-linear flow path may be used. A secondary combustion chamber may be formed from a linear path which may include honey combed ceramic catalytic beds as flow through structure for the combustion components. In such an embodiment, an afterburner may be used to redirect airflow rearward through a secondary combustion chamber which may be substantially parallel to the primary combustion flowpath but in a rearward direction. In such version, the catalytic bed of material allow the reactions to properly occur between the products of incomplete combustion or post primary combustion such as to reduce noxious or other undesirable components.

Alternatively in any of the embodiments, an afterburner may be implemented, but is not necessary. The afterburner 70 depicted may extend downstream from the combustion zone of the combustion chamber as depicted. The fuel introduced in the primary combustion zone 38 allows the flammable and combustible fuel to burn appropriately where it is atomized, mixed with air in the proper ratios and ignited within the chamber. The resulting products of combustion flow toward the afterburner 70 downstream from the fuel nozzle 30 by virtue of the airflow induced by the fan assembly 12. Incomplete combustion, as previously indicated, is not uncommon in various types of heaters for multiple reasons including with improper air/fuel ratios, inadequate fuel atomization/vaporization, fuel contamination, type of fuel, temperature, and other factors known to reduce combustion efficiencies resulting in emission of noxious combustion by-products. To reduce such undesirable by-products of the combustion process and particularly unburned fuel material and to prevent such unburned fuel and other by-products from exiting the heater through the heater outlet 13, the afterburner 70 may be provided and positioned at the discharge end of the one combustion zone 38. The afterburner 70 may incorporate a nose portion 71 as well as a ring 72 wherein the nose portion is joined to the ring portion as depicted in U.S. Pat. No. 5,307,800, the contents of which are incorporated herein by reference.

During operation of the portable forced air heater 10 depicted in the various embodiments, the flow of by-products from flame combustion within the combustion chamber may be altered by the nose cone portion 71 in order to further combust unburned fuel elements on the surface thereof. During operation of the heater, due to the fact that the afterburner 70 is placed directly downstream from the primary combustion zone 38, significant heating of the afterburner 70 and the nose portion 71 occurs. Direct contact on the afterburner 70 of these combustion by-products and uncombusted fuel droplets as well as exposure to air from within the combustion chamber or from ambient air inlets provided from the ambient air channel 23 or other ambient air source allows the continued combustion of these products to be maintained within the heater 10 and combustion chambers or interior to the heat shield 33.

In regards to the present embodiment and implementation of the afterburner 70 and with regards to the specific embodiments depicted herein, the afterburner 70 may be placed prior to the cooling zone or may be coextensive with the cooling zone 37. Additionally, downstream from the cooling zone 37 and from the afterburner 70 may be placed the secondary combustion zone 39 in conjunction with, in the presently depicted embodiment, the catalyst 50. By incorporation of the afterburner 70 in the various embodiments, continued oxidation of the fuel products or additional combustion of the primary combustion by-products may be exhibited and a more efficient processing of the combustion materials results.

In varying embodiments, internally extending protuberances or flanges 75 or 68 may be placed on the interior side wall of the heat shield 33 in direct contact with the flow path of ambient airflow and/or exhaust gases. These alternative flanges or cooling devices 75 may be placed in varying positions and are shown in some embodiments within the cooling zone prior to the second combustion zone 39 and prior to the catalyst 50. These flanges 75 disrupt airflow effectively increasing the cooling rate of the products of combustion prior to entry through the catalyst bed 50. These flanges 75 may be placed in varying positions as seen and may take the shape of many different and readily available structures. These structures merely create turbulence to assist in mixing in the cooling zone 37, effectively reducing exhaust gas temperatures. Additionally, these optional flanges 75 may be positioned within the combustion zones, within the cooling zones or in other areas to create a desirable effect and position the turbulent airflow as may be necessitated.

Optionally as shown in the varying embodiments, an ambient airflow channel 23 may be provided to reposition cooler air from the fan assembly 12 or exterior areas around the heat shield 33 thereby keeping the exterior outer housing 20 cool and provide cooler ambient air to various positions in the combustion and oxidation process. The ambient airflow channel 23 in this embodiment carries cool ambient airflow forced from fan assembly 12 around the combustion zone and possibly to the cooling zone thereby increasing the effectiveness of the various combustion zones and potential cooling zones by mixing ambient air in the cooling zone at various apertures 36 which allows ambient air to pass into the cooling zone and mix therewith. Alternative embodiments incorporate apertures 36 in varying locations such as within the combustion zones, within the cooling zones, through the walls 33, 31, or in other placements as are desirable and may be readily implemented with various bleed apertures allowing airflow to enter at the differing locations.

The portable forced air heater 10 of the present invention is portable and may be placed on varying carrier devices which allow ready portability by the operator. As shown in the varying embodiments depicted, these include wheelbarrow type carriers or other support structure which supports the housing unit and tank. Varying carrier constructions may be employed such as wheeled carriers or non-wheeled carriers to support and allow mobility of the unit 10. Such mobility allows the unit 10 to be placed where desired which are typically unheated and require significant heat output in a portable fashion. The fuel tank 16, as shown in the varying embodiments, may be mounted on the carrier and supported therewith or may be separate from the heater, as in the case of gaseous fuels, and may contain the fuel contents which are passed to the fuel nozzle 30. This fuel may be, as previously indicated, gaseous or liquid fuel types including kerosene, diesel fuel, natural or LP gas. The design implemented herein with regards to the portable forced air heater 10 of the present embodiment may be implemented with varying fuel sources.

The construction elements of the portable forced air unit 10 of the present invention may incorporate steel for the outer housing 10 and for the inner heat shield 33. Similarly, heat resistant or corrosion resistant steel may also be implemented for the afterburner utilizing the varying embodiments. Further, the fan assembly 12 may be any configuration including, but not limited to centrifugal or axial designs and may provide air at varying airflows. A thermocouple 18 or other type sensor such as an optical sensor may be implemented to provide sensor and combustion characteristics to a control system controlling heat output, fan speed, fuel flow and the like.

The foregoing description of structures and methods has been presented for purposes of illustration. It is not intended to be exhaustive or to limit the invention to the precise steps and/or forms disclosed, and obviously many modifications and variations are possible in light of the above teaching. It is understood that while certain forms of the forced air heater have been illustrated and described, it is not limited thereto except insofar as such limitations are included in the following claims and allowable functional equivalents thereof.

We claim:

1. A portable forced air heater comprising:
a least one fuel nozzle having a fuel outlet;
a blower having an air outlet;
a first combustion zone having an inlet, said fuel outlet being in flow communication with said first combustion zone inlet, said blower air outlet being in flow communication with said first combustion zone inlet;
a cooling zone having an inlet in flow communication with the exhaust gases exiting an outlet of said first combustion zone;
an active cooling device within said cooling zone to promote mixing of air flow from said blower and/or exhaust gases from said first combustion zone; and
a second combustion zone having an inlet in flow communication with an outlet of said cooling zone and including a catalytic bed.

2. The portable forced air heater of claim 1 further comprising an afterburner proximate said outlet of said first combustion zone.

3. The portable forced air heater of claim 1 wherein said first combustion zone, cooling zone said active cooling zone and said second combustion zone are linearly positioned.

4. The portable forced air heater of claim 1 further comprising a secondary air inlet in said cooling zone.

5. The portable forced air heater of claim 4 wherein said secondary air inlet is in flow communication with said blower air outlet.

6. The portable forced air heater of claim 5 further comprising at least one deflector to aid in mixing ambient air with heated air.

7. The portable forced air heater of claim 6 where said at least one deflector depends inwardly from an inner wall of said cooling zone downstream from said secondary air inlet and is suitable for mixing products of combustion produced in said first combustion zone with air entering said cooling zone through said secondary air inlet.

8. The portable forced air heater of claim 1 wherein said catalyst is optimized to minimize CO and/or other products of incomplete combustion.

9. A portable forced air heater having a plurality of combustion areas and a cooling area, comprising:
a housing having a nozzle mounted therein, said nozzle in fuel line communication with a fuel source;
an ignition source proximate to a first combustion area, said first combustion area creating heated combustion gases;
a non-combustion cooling area of sufficient size to slow the rate of oxidation of said heated combustion gases to below a predefined maximum catalyst oxidation temperature;
an active cooling device within said housing to aid in cooling of said heated combustion gases; and
a second combustion area allowing further oxidation of said heated combustion gases with a catalytic material bed.

10. The portable forced air heater of claim 9 wherein said housing has a forced air blower at one end forcing air through said housing, past said nozzle.

11. The portable forced air heater of claim 10 wherein said housing has a primary air flow path and a secondary air flow path, said first combustion area at least partially including said primary air flow path.

12. The portable forced air heater of claim 11 wherein said secondary air flow path excludes said first combustion area.

13. The portable forced air heater of claim 11 wherein said secondary air flow path includes ambient air.

14. The portable forced air heater of claim 9 further including a tertiary combustion area for oxidation of unburned fuel downstream of said first combustion area.

15. The portable forced air heater of claim 14 wherein said tertiary combustion area is an afterburner positioned upstream to said second combustion area.

16. The portable forced air heater of claim 9 wherein said second combustion area includes non-flammable oxidation of said heated combustion gases.

17. A portable forced air heater incorporating first and second combustion zones with a cooling zone, comprising:
a heater housing enclosing an air flow path, said housing having a forced air blower at a first end;
a fuel nozzle within said housing in flow communication with a fuel source for providing a fuel in said housing;
an ignition source adjacent said nozzle;
a first flammable combustion zone within said housing for oxidation of said fuel creating an outflow of heated exhaust gases;

a cooling zone downstream of said first combustion zone and between said first combustion zone and a second combustion zone;

active cooling devices in said path of combustion gases to aid in the average temperature reduction of said gases;

wherein said cooling zone is spaced sufficiently from said first combustion zone and said second combustion zone to slow the rate of oxidation of said heated combustion gases to a predefined level;

an afterburner for burning non-oxidized fuel droplets in said outflow combustion gases;

said second combustion zone being a non-flammable combustion area incorporating a catalytic material; and wherein said reduction of oxidation to said predefined level is consistent with allowing catalytic oxidation of said heated combustion gases with said catalytic material.

18. The portable forced air heater of claim 17 wherein said second combustion zone is a flow through catalytic bed.

19. The portable forced air heater of claim 18 further including ambient air channels around said first combustion zone.

20. The portable forced air heater of claim 17 further including inwardly directed deflectors at said cooling zone to increase cooling and turbulence of said heated combustion gases.

* * * * *